(12) United States Patent
Masse et al.

(10) Patent No.: US 9,336,126 B1
(45) Date of Patent: May 10, 2016

(54) CLIENT-SIDE EVENT LOGGING FOR HETEROGENEOUS CLIENT ENVIRONMENTS

(71) Applicant: Amazon Technologies, Inc., Reno, NV (US)

(72) Inventors: Patrick John Masse, Woodinville, WA (US); James Edward Masse, Woodinville, WA (US); Scott Harold Anderson, Lynnwood, WA (US); Scott Thomas Labadie, Bellevue, WA (US); Shivshankar Iranna Kumbhar, Seattle, WA (US); Sean Timothy Sweeney, Redmond, WA (US); Amanda Ducrou, Brisbane (AU); Xuan Lin, Issaquah, WA (US); Vikas Taneja, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/313,556

(22) Filed: Jun. 24, 2014

(51) Int. Cl.
  *G06F 9/44* (2006.01)
  *G06F 11/36* (2006.01)
  *G06F 9/445* (2006.01)

(52) U.S. Cl.
  CPC ........ *G06F 11/3672* (2013.01); *G06F 11/3664* (2013.01); *G06F 11/3688* (2013.01); *G06F 9/44589* (2013.01); *G06F 11/3684* (2013.01)

(58) Field of Classification Search
  CPC ............ G06F 11/3688; G06F 11/3664; G06F 11/3684; G06F 9/44589; G06F 11/3419
  See application file for complete search history.

(56) References Cited

U.S. PATENT DOCUMENTS

| | | | |
|---|---|---|---|
| 6,421,822 B1 | 7/2002 | Pavela et al. | |
| 6,701,514 B1 * | 3/2004 | Haswell et al. | 717/115 |
| 6,810,494 B2 | 10/2004 | Weinberg et al. | |
| 6,907,546 B1 * | 6/2005 | Haswell et al. | 717/124 |
| 7,028,223 B1 | 4/2006 | Kolawa et al. | |
| 7,330,887 B1 * | 2/2008 | Dharmadhikari | 709/224 |
| 8,145,726 B1 | 3/2012 | Roche et al. | |

(Continued)

OTHER PUBLICATIONS

Marti Kaljuve, "Cross-Browser Document Capture System", May 2013, University of Tartu, pp. 1-45; <comserv.cs.ut.ee/forms/ati_report/downloader.php?file..>.*

(Continued)

*Primary Examiner* — Thuy Dao
*Assistant Examiner* — Ben C Wang
(74) *Attorney, Agent, or Firm* — Kilpatrick Townsend & Stockton LLP

(57) ABSTRACT

A testing model for heterogeneous client environments is enabled. A test of a computer system state transition may be specified. The test specification may include elements corresponding to test actions that cause the computer system state transition and elements corresponding to test conditions that are evaluated to generate the test results. A collection of pre-assembled executable components suitable for implementing specified tests at a wide variety of clients may be maintained, and particular test specifications may be mapped to a corresponding and optimal implementation subset of the collection. Test results may be determined based on one or more outputs of the implementation subset of executable components. A vendor and version independent browser driver may include code capable of identifying an operational set of browser capabilities among the superset of considered browser capabilities independent of vendor or version identification by a browser under test.

21 Claims, 16 Drawing Sheets

(56) References Cited

U.S. PATENT DOCUMENTS

| | | | |
|---|---|---|---|
| 8,327,271 | B2 | 12/2012 | Miller et al. |
| 8,332,818 | B1* | 12/2012 | Haugh et al. ............... 717/124 |
| 8,522,212 | B1 | 8/2013 | Bhatnagar et al. |
| 8,799,862 | B2 | 8/2014 | Adamson et al. |
| 8,863,085 | B1 | 10/2014 | Stahlberg |
| 8,966,454 | B1 | 2/2015 | Michelsen et al. |
| 9,122,803 | B1 | 9/2015 | Michelsen |
| 9,189,377 | B1 | 11/2015 | Arkadyev |
| 2002/0097268 | A1 | 7/2002 | Dunn et al. |
| 2003/0005044 | A1* | 1/2003 | Miller et al. ............... 709/203 |
| 2006/0101404 | A1* | 5/2006 | Popp et al. ............... 717/124 |
| 2009/0249216 | A1* | 10/2009 | Charka et al. ............... 715/744 |
| 2010/0251216 | A1 | 9/2010 | Low et al. |
| 2011/0093773 | A1 | 4/2011 | Yee et al. |
| 2011/0123973 | A1 | 5/2011 | Singh et al. |
| 2011/0173589 | A1 | 7/2011 | Guttman et al. |
| 2011/0276946 | A1 | 11/2011 | Pletter et al. |
| 2011/0289489 | A1 | 11/2011 | Kumar et al. |
| 2011/0320880 | A1* | 12/2011 | Wenig et al. ............... 714/39 |
| 2012/0265824 | A1 | 10/2012 | Lawbaugh et al. |
| 2012/0331441 | A1 | 12/2012 | Adamson et al. |
| 2013/0007711 | A1 | 1/2013 | Fryc et al. |
| 2013/0055028 | A1 | 2/2013 | Patil et al. |
| 2013/0111595 | A1* | 5/2013 | Amit et al. ............... 726/25 |
| 2013/0152047 | A1 | 6/2013 | Moorthi et al. |
| 2013/0159784 | A1* | 6/2013 | Rossi ............... 714/47.1 |
| 2013/0290786 | A1* | 10/2013 | Artzi et al. ............... 714/32 |
| 2013/0297973 | A1 | 11/2013 | Hyland et al. |
| 2013/0339930 | A1* | 12/2013 | Xu ............... 717/125 |
| 2014/0053057 | A1 | 2/2014 | Reshadi et al. |
| 2014/0075242 | A1 | 3/2014 | Dolinina et al. |
| 2014/0075344 | A1* | 3/2014 | Bentrup ............... 715/760 |
| 2014/0105491 | A1 | 4/2014 | Hayek et al. |
| 2014/0132571 | A1* | 5/2014 | Zeng et al. ............... 345/178 |
| 2014/0136944 | A1* | 5/2014 | Harris et al. ............... 715/234 |
| 2014/0380278 | A1* | 12/2014 | Dayan ............... 717/124 |
| 2015/0082256 | A1 | 3/2015 | Lee et al. |
| 2015/0089299 | A1* | 3/2015 | Gittelman et al. ............... 714/38.14 |
| 2015/0100679 | A1 | 4/2015 | Chandaka et al. |
| 2015/0169434 | A1 | 6/2015 | De Angelis et al. |
| 2015/0278883 | A1* | 10/2015 | Stergiou et al. ............... 717/124 |
| 2015/0286470 | A1 | 10/2015 | Dahan |
| 2015/0309813 | A1 | 10/2015 | Patel |

OTHER PUBLICATIONS

Mesbah et al., "Automated Cross-Browser Compatibility Testing", ACM, ICSE'11, May 21-28, 2011, pp. 561-570; <http://dl.acm.org/citation.cfm?id=1985870&CFID=567696009&CFTOKEN=37586931>.*

Hossen et al., "Automatic generation of test drivers for model inference of web applications", Mar. 2013 IEEE, pp. 441-444; <http://ieeexplore.ieee.org/stamp/stamp.jsp?tp=&arnumber=6571668>.*

U.S. Appl. No. 14/313,478, filed Jun. 24, 2014, Titled: Transition Testing Model for Heterogeneous Client Environments.

U.S. Appl. No. 14/313,624, filed Jun. 24, 2014, Titled: Vendor & Version Independent Browser Driver.

U.S. Appl. No. 14/313,665, filed Jun. 24, 2014, Titled: Managing Browser Security in a Testing Context.

Le Hors, et al. Document Object Model (DOM) Level 3 Core Specification. W3C, Version 1.0, Apr. 7, 2004, pp. 1-216 [online], [retrieved on Jun. 24, 2014]. Retrieved from the Internet <URL: http://www.w3.org/TR/2004/REC-DOM-Level-3-Core-20040407>.

Selenium Documentation. Introduction [online]. Selenium HQ, Feb. 2013 [retrieved on Jun. 24, 2014]. Retrieved from the Internet: <URL: http://docs.seleniumhq.org/docs/01_introducing_seienium.jsp>.

Selenium Documentation. Selenium 1 (Selenium RC) [online]. Selenium HQ, Feb. 2013 [retrieved on Jun. 24, 2014]. Retrieved from the Internet: <URL: http://docs.seleniumhq.org/docs/05_selenium_rc.jsp>.

Selenium Documentation. Test Design Considerations [online]. Selenium HQ, Feb. 2013 [retrieved on Jun. 24, 2014]. Retrieved from the Internet: <URL: http://docs.seleniumhq.org/docs/06_test_design_considerations.jsp>.

Selenium Documentation. Selenium WebDriver [online]. Selenium HQ, Feb. 2013 [retrieved on Jun. 24, 2014]. Retrieved from the Internet: <URL: http://docs.seleniumhq.org/docs/03_webdriver.jsp>.

* cited by examiner

CLIENT-SIDE EVENT LOGGING FOR HETEROGENEOUS CLIENT ENVIRONMENTS

CROSS-REFERENCE TO RELATED APPLICATIONS

This application is related to and incorporates by reference for all purposes the full disclosure of co-pending U.S. patent application Ser. No. 14/313,478, filed Jun. 24, 2014, entitled "TRANSITION TESTING MODEL FOR HETEROGENEOUS CLIENT ENVIRONMENTS", U.S. patent application Ser. No. 14/313,624, filed Jun. 24, 2014, entitled "VENDOR AND VERSION INDEPENDENT BROWSER DRIVER", and U.S. patent application Ser. No. 14/313,665, filed Jun. 24, 2014, entitled "MANAGING BROWSER SECURITY IN A TESTING CONTEXT".

BACKGROUND

It has become common to develop computing applications for computing environments that include a variety of computing servers and computing clients. In particular, it has become common for a particular computing application to be developed to function suitably with a wide variety of computing clients. For example, so-called Web and/or JavaScript® applications are commonly expected to operate with a wide variety of hypertext document browser clients including browsers developed by multiple vendors for multiple different hardware platforms and having multiple different versions each with different capabilities. This is a challenging development environment in which application testing can play an even more significant role than usual. Several conventional testing suites have been developed for such environments, and particularly for testing Web applications. However, each such testing suite has its shortcomings.

For example, some conventional test suites are unreliable, inconsistent, inefficient and/or ineffective. Failure to deal properly with ephemeral, transitory and/or race conditions can result in a high rate of false negative (e.g., indications that a test has been failed when a client is actually behaving as desired) and/or false positive (e.g., indications that a test has been passed when the client is actually misbehaving) test results. Since this is typically unacceptable, test developers may undertake development of "compensation code" to attempt to correct a conventional test suite's failure to deal properly with certain conditions. However, such compensation code tends to be complex and/or client-specific and can require expert knowledge of each of the plurality of clients. The complexity alone is problematic, since it can raise the likelihood that the testing process itself introduces errors (sometimes called computer programming "bugs").

As another example, some conventional test suites delegate test object identification to a client under test. This can open another avenue for unreliability and/or inconsistency since the client's object identification mechanism may be flawed and/or ambiguous, again raising the likelihood of false negative and/or false positive test results. In such cases, even the stop-gap of compensation code may not be available to test developers.

BRIEF DESCRIPTION OF THE DRAWINGS

Various embodiments in accordance with the present disclosure will be described with reference to the drawings, in which.

DETAILED DESCRIPTION

Figure 1:
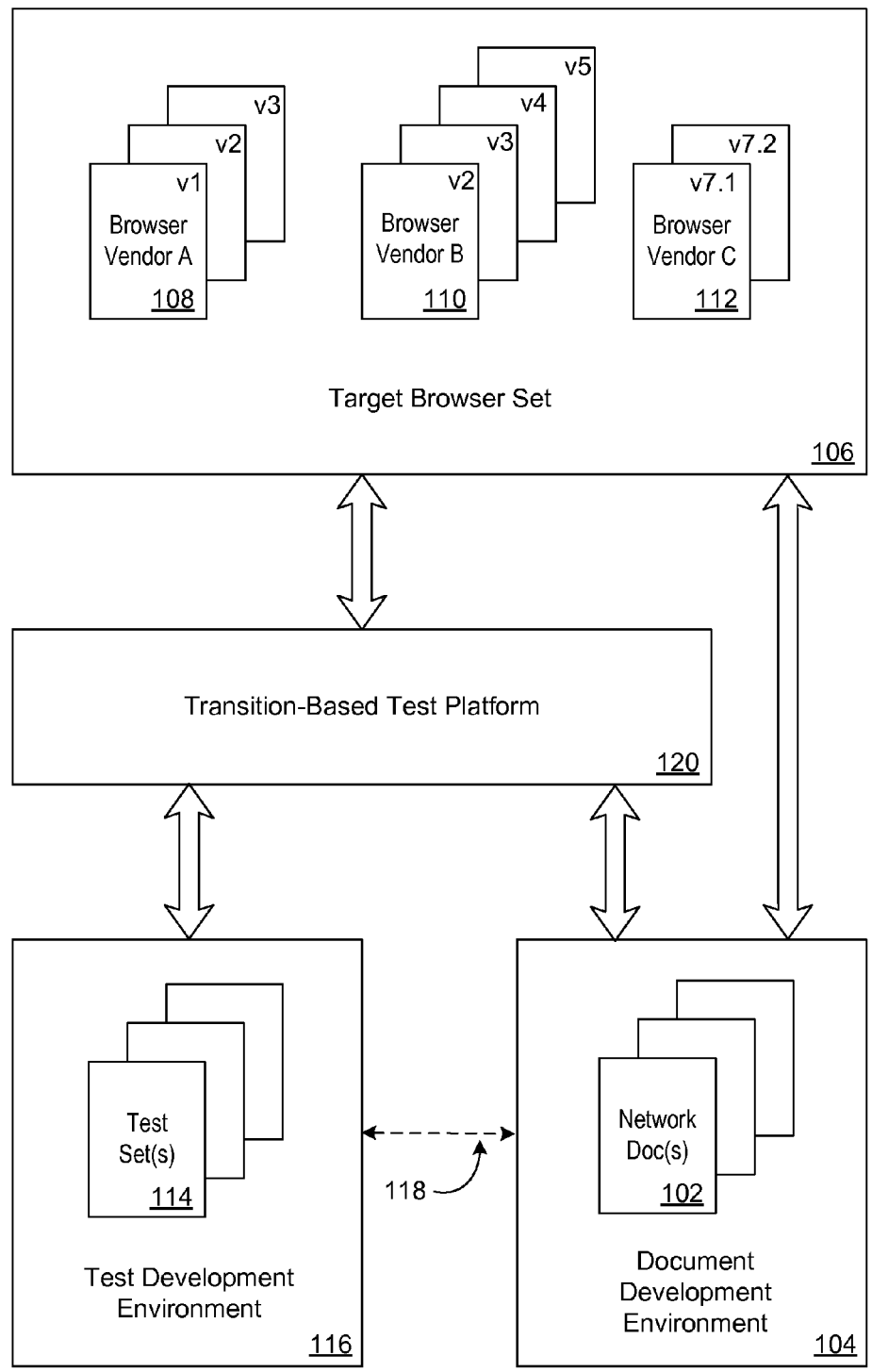
FIG. 1 is a schematic diagram depicting aspects of an example computing system architecture in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In accordance with at least one embodiment, a transition testing model for heterogeneous client environments is enabled. A test of a computer system state transition may be specified with a suitable test description language. The test specification may include multiple element types including elements corresponding to test actions that cause the computer system state transition and elements corresponding to test conditions that are evaluated to generate the test results. A collection of predefined and/or pre-assembled (collectively, "pre-assembled") executable components suitable for implementing specified tests at a wide variety of clients may be maintained and/or determined, and particular test specifications may be mapped to a corresponding implementation subset of the collection, for example, to an optimal subset. Test results may be determined based on one or more outputs of the implementation subset of executable components, and the test results may be provided for presentation to a user.

For example, a test developer may specify a test of a Web page state transition with an adapted version of the Java® programming language. The Web page may be part of a Web application currently under development. The test specification may include one or more actions to be performed with respect to the Web page and/or a hypertext document browser that loads and renders the Web page. For example, such actions may correspond to clicking a hyperlink of the Web page, making a selection with respect to a field of a form of the Web page or interacting with an interactive element (e.g., a button) of the Web page. A collection of JavaScript® scripts and/or snippets may be maintained suitable for implementing tests at a wide variety of browsers, and the test specification may be mapped to an optimal (e.g., minimized and/or non-maximal) test implementation subset. The test implementation subset may be injected into a sandboxed script execution environment of a target browser and executed to perform the test in accordance with the test specification. Although, for clarity, examples are described herein with reference to a network document "browser," any suitable programmatic object and/or client (collectively, "client") configurable to process information may be substituted, for example, clients configurable with a suitable programming language and/or utilizing suitable programmatic interfaces.

In accordance with at least one embodiment, client-side event logging for heterogeneous client environments is enabled. The implementation subset of executable components corresponding to a test specification may include a condition evaluation subset of executable components associated with a set of conditions to be evaluated as part of the test and an event capture subset of executable components selected to record an optimal set of events with respect to evaluation of the set of conditions. During a test, there may be periods of time when access to the condition evaluation subset of executable components is not available. During these times, the event capture subset of executable components may record relevant events so that, once access to the condition evaluation subset of executable components becomes available, the condition evaluation subset of executable components can be utilized to evaluate the set of conditions based on current state as well as the recorded event history.

For example, a hypertext document browser may provide a programmatic interface (e.g., an application programming interface or API) enabling JavaScript® code components to receive a wide variety of events associated with the hypertext document browser and/or a Web page loaded and/or rendered by the browser. A test specification may be analyzed to determine a relevant subset of such events, and the relevant subset may be mapped to a corresponding event capture subset of JavaScript® code components. The event capture components may be injected, along with the entire set of test implementation components, into a sandboxed script execution environment of the browser under test, for example, with a browser plug-in, and may record the relevant subset of published events to a data store maintained from the sandboxed script execution environment. The test implementation components may cause a state transition as specified, for example, with respect to a Web page loaded and/or rendered by the browser, and then evaluate the specified set of conditions based on a current state of the Web page as well as the relevant subset of published events recorded in the data store.

A browser may be identified by vendor and version. However, maintaining a browser driver for each combination of vendor and version can be a substantial task capable of introducing errors into the testing process. Maintaining a single browser driver that varies its behavior based on a particular presentation of vendor and version may not be a substantial improvement. In accordance with at least one embodiment, testing with a single vendor and version independent browser driver is enabled. The vendor and version independent browser driver may include executable components capable of identifying an operational set of browser capabilities among the superset of considered browser capabilities when the executable components are injected into an execution environment of a browser under test, and used to determine test results. Such browser capabilities may correspond to programmatic interface elements of the browser, and the browser driver may select an optimal (e.g., minimized and/or non-maximal) subset of the interface elements to instrument to collect data to determine the test results. Where the execution environment is single threaded, the browser driver can track objects of the browser under test across thread surrenders, including problematic user interface objects such as graphical user interface windows, for example, by associating unique identifiers with the objects (e.g., via naming). Although vendor and version may be sufficient to identify a type of browser, at times, one or more additional attributes may be required to uniquely identify a type of browser such as a computer operating system ("OS") for which the type of browser is configured. As used herein, references to the vendor and/or version of a browser may be substituted with a browser type identifier that includes suitable attributes to uniquely distinguish among browser types. Any suitable technique may be utilized to instrument browser interface elements including overriding a browser interface element with a suitable substitute (e.g., which "hooks" or invokes the original interface element), subscribing to and/or registering for corresponding interface element events and caller-side invocation replacement. Such techniques are referred to herein collectively as browser interface element "instrumentation" and/or "overriding" browser interface elements.

Network document browsers may maintain a variety of security schemes which can interfere with instrumentation and sensing by a browser driver. Nevertheless, it is desirable to leave the security schemes enabled since user code interaction with such security schemes can be the subject of testing. In accordance with at least one embodiment, management of network document browser security in a testing context is enabled. Browsers under test may associate different network regions with different security contexts. A facility may intercept requests and modify responses to include browser driver code and to appear to originate from a suitable network region (e.g., suitable for testing purposes). Browsers under test may be configured to generate secondary security contexts for portions of test code. The potential for the generation of such secondary security contexts may be detected by injected browser driver code and the portions of the test code to be executed in the secondary security context may be modified to enable communication of test data to the primary security context. Browsers under test may resist instrumentation by browser driver code, for example, by preventing overriding of interface elements activated by test code. In such cases, caller-side overriding may be implemented by rewriting test code to call corresponding executable components of the browser driver.

Turning now to the figures, FIG. 1 depicts aspects of an example system architecture 100 in accordance with at least one embodiment. A team of computing application developers may develop a set of network documents 102 in a document development environment 104. The team may intend that the network documents 102 be presentable and/or provide suitable functionality across a target set of network document browsers 106. The target browser set 106 may include multiple types of network document browser 108, 110, 112 from multiple browser vendors. Each of the types of network document browser 108, 110, 112 may be available in multiple versions. For example, network document browser 108 may be available in versions v1, v2 and v3. Network document browser 110 may be available in versions v2, v3, v4 and v5. Network document browser 112 may be available in versions v7.1 and v7.2. Browser vendors may develop network document browsers 108, 110, 112 for multiple computer operating systems. In accordance with at least one embodiment, a (vendor, version, operating system) 3-tuple may be utilized to identify elements of the target browser set 106.

To ensure that the network documents 102 behave as expected when rendered by each of the browsers 108, 110, 112 in the target browser set 106, a team of test developers may develop one or more test sets 114 in a test development environment 116. Although in FIG. 1, the document development environment 104 and the test development environment 116 are shown as distinct and independent, each embodiment is not so limited. In accordance with at least one embodiment, dashed arrow 118 indicates that there is a correspondence between the network documents 102 and the test set(s) 114. The correspondence need not be one-to-one.

The test set(s) 114 may specify one or more browser state transitions and/or network document state transitions with a suitable test description language and may be provided to a transition-based test platform 120. The transition-based test platform 120 may manage implementation of tests in accordance with the specified test set(s) 114 and with respect to at least some of the target browser set 106. Where a test set 114 references a network document 102, the transition-based test platform 120 and/or the browsers in the target browser set 106 may access the network document 102 with the document development environment 104 and/or an associated document server (not shown in FIG. 1).

The network document(s) 102 may include any suitable document written with any suitable document description language including one or more document markup languages such as a structured generalized markup language (e.g., SGML), an extensible markup language (e.g., XML) and a hypertext markup language (e.g., HTML) and/or one or more computer programming languages such as a compiled programming language (e.g., C, C++, Java®) and an interpreted programming language (e.g., PHP, JavaScript®). Although, in an embodiment, the same holds for the test set(s) 114, the document description languages utilized for the network document(s) 102 and the test set(s) 114 need not be the same. As one non-limiting example, the network document(s) 102 may be hypertext documents (sometimes called "Web pages") and the browsers 106 may be hypertext document browsers (sometimes called "Web browsers"), while the test set(s) may be written in an adapted version of the Java® programming language. Example test set(s) 114 are described below in more detail with reference to FIG. 2. The transition-based test platform 120 is described below in more detail with reference to FIG. 3. An example browser in accordance with at least one embodiment is described below in more detail with reference to FIG. 4.

Figure 2:
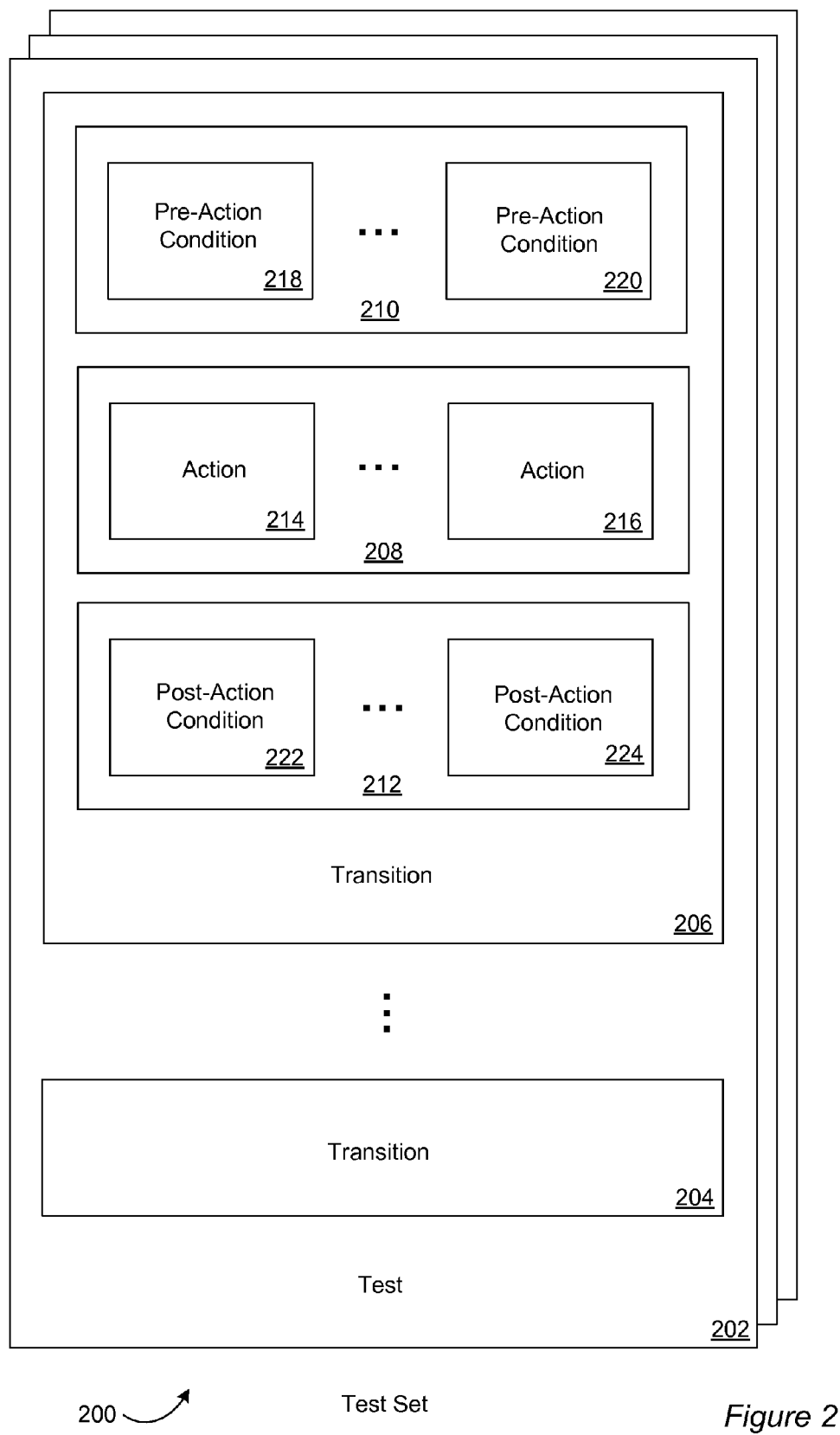
FIG. 2 is a schematic diagram depicting aspects of an example transition-based test specification in accordance with at least one embodiment.

FIG. 2 depicts aspects of an example test set 200 in accordance with at least one embodiment. The test set 200 of FIG. 2 is an example of the test set(s) 114 of FIG. 1. The example test set 200 includes multiple tests such as test 202. Each such test may include one or more transitions 204, 206. As is conventional, the ellipsis between transitions 204 and 206 indicates that the test 202 may include any suitable number of such transitions. The ellipsis is used similarly throughout the drawings.

Each transition 204, 206 may include one or more test actions 208, one or more pre-action test conditions 210 and/or one or more post-action test conditions 212. For example, transition 206 may include test actions 214, 216, pre-action conditions 218, 220, and post-action conditions 222, 224. In accordance with at least one embodiment the pre-action conditions 218, 220 are optional. The test actions 208 may specify one or more actions to be performed at a client (e.g., a browser of the target browser set 106 of FIG. 1) to cause a client state transition. The pre-action conditions 210 may specify one or more conditions to be evaluated before performing the actions 208 at the client. The post-action conditions 212 may specify one or more conditions to be evaluated once the client state transition has begun, during the client state transition and/or once the client state transition has finished.

The test actions 208 may include any suitable actions that can be performed and/or caused at the client. For example, a network document browser 108 may provide a programmatic interface specifying the actions that can be performed and/or caused. The pre and post action conditions 210, 212 may include any suitable conditions that can be evaluated with information obtained from the client. For example, the programmatic interface of the network document browser 108 may specify a set of events and event parameters available for use in evaluating test conditions. For the example of a hypertext document browser, such a programmatic interface may be in accordance with an ECMAScript standard and may include a document object model (DOM).

As depicted in FIG. 1, the elements 208, 210, 212 of each transition 206 may be arranged in a hierarchy and a nested hierarchy. For example, the test 202 may be understood as a root node of the hierarchy having transitions 204, 206 as child nodes. Actions 208, pre-action conditions 210 and post-action conditions 212 may be child nodes of transition 206. Actions 214, 216 may be child nodes of actions 208, and so on. Although actions 214, 216 are depicted in FIG. 1 as leaf nodes of the hierarchy, each embodiment is not so limited. The hierarchies may be of any suitable depth. The structure of the hierarchy may define relationships between the elements of the test 202 including relationships with respect to grouping as a unit and order of execution/evaluation. The hierarchy may be defined with any suitable feature or set of features of the test description language. Further relationships that may be defined include that particular groups of actions 208 be performed concurrently or in a specified order, that particular groups of conditions 212 be evaluated in a specified order, at a specified point in time or with respect to a specified time period (e.g., all conditions in the group are expected to evaluate as true at some point during the time period, but not necessarily all at the same time).

Figure 3:
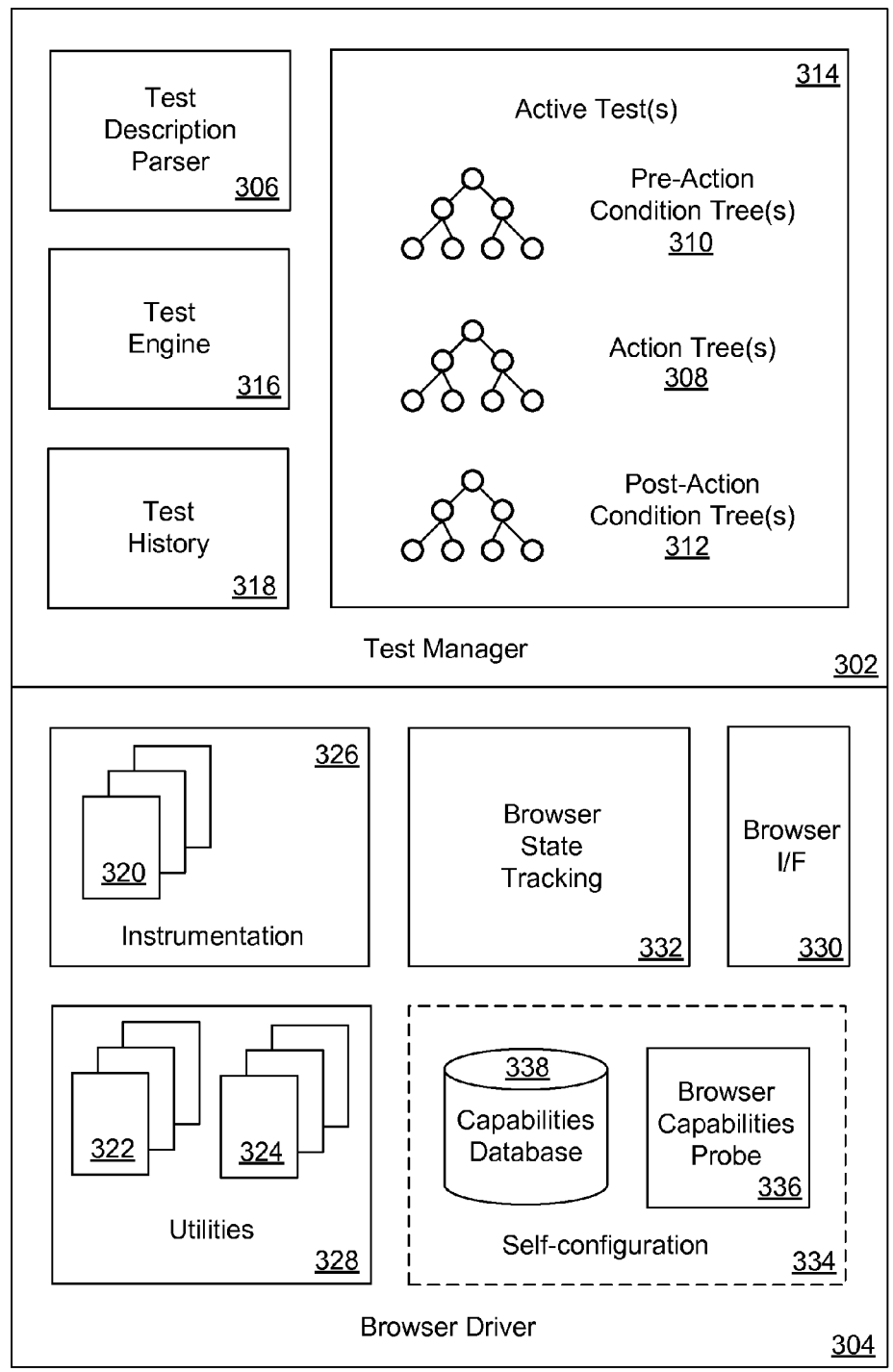
FIG. 3 is a schematic diagram depicting aspects of an example transition-based test platform in accordance with at least one embodiment.

FIG. 3 depicts aspects of an example transition-based test platform 300 in accordance with at least one embodiment. The transition-based test platform 300 of FIG. 3 is an example of the transition-based test platform of FIG. 1. The transition-based test platform 300 may include a test manager 302 configured at least to manage test set(s) 114 provided to the transition-based test platform 300 and a browser driver 304 configured at least to interact with one or more of the target browser set 106 and cause implementation of one or more tests in accordance with the provided test set(s) 114.

The test manager 302 may include a test description parser 306 configured to parse provided test set(s) 114 (FIG. 1) in accordance with the test description language. The test description parser 306 may create action trees 308, pre-action condition trees 310 and post-action condition trees 312 in an active test(s) data store 314. The trees 308, 310, 312 may correspond to the hierarchies and nest hierarchies specified by the provided test set 200 (FIG. 2). A test engine 316 may utilize the browser driver 304 to perform the tests in accordance with the provided test set(s) 114. For example, the test engine 316 may interact with the browser driver 304 to cause actions to occur at one or more browsers 108, 110, 112 of the target browser set 106 in accordance with the relationships defined by the corresponding action tree(s) 308. The test engine 316 may also receive test results and/or test result components from the browser driver 304 and evaluate the test results in accordance with the condition relationships as defined by the pre and post action condition trees 310, 312. In accordance with at least one embodiment, explicit condition trees 310, 312 may enable rapid detection of test failure, for example, in a test that requires multiple conditions to be jointly true in order to pass. Transition networks (e.g., including condition trees 310, 312 and/or action trees 308) may define path-dependent tests which involve fulfilling specified conditions in a particular order and/or in response to particular action sequences. A test history module 318 may archive completed tests for later reference by a user of the transition-based test platform 300.

The browser driver 304 may maintain multiple sets of pre-assembled executable components 320, 322, 324 utilizable to implement test set(s) 114 (FIG. 1) at one or more of the target browser set 106. For example, the browser driver 304 may maintain instrumentation 326 suited to capturing and recording client events that are relevant to a given test set 200 (FIG. 2), as well as utilities 328 suited to causing test actions and facilitating evaluation of test conditions. Responsive to instructions from the test manager 302, the browser driver may determine an optimal (e.g., minimized and/or non-maximal) subset of the pre-assembled executable components 320, 322, 324 suitable for implementing a particular test or test set. For example, the browser driver may determine a set of evaluation parameters used to evaluate a set of conditions, map the set of parameters to a relevant set of client events capable of providing the set of evaluation parameters and further map the relevant set of client events to the pre-assembled executable components 320, 322, 324 to determine the optimal subset. Although smaller subsets may be desirable for performance reasons, a strictly minimal subset may not be optimal, for example, due to uncertainties and/or ambiguities with respect to browser capabilities, including dynamic changes of browser capabilities. The pre-assembled executable components 320, 322, 324 may be predefined and/or deterministically assembled to achieve the desired functionality. In accordance with at least one embodiment, machine learning techniques may be utilized to assemble the executable components, for example, adapting the assembled executable components with respect to optimality and/or adapting the optimal subset of predefined and/or pre-assembled executable components 320, 322, 324. Machine learning components may be trained with respect to executable component size, number, selection and/or assembly utilizing observations from tests over a variety of browsers in the browser target set 106 (FIG. 1).

The browser driver 304 may interact with one or more of the target browser set 106 (FIG. 1) utilizing a browser interface 330, including injecting selected executable components 320, 322, 324 into selected browsers to implement tests, and keep track of browser state with a browser state tracking module 332. In accordance with at least one embodiment, the browser driver 304 may incorporate a self-configuration module 334 capable of probing a browser with a browser capabilities probe 336 to determine the browser's capabilities and of comparing the browser's capabilities with a universal set of browser capabilities documented in a capabilities database 338. Particular pre-assembled executable components 320, 322, 324 may correspond to particular capabilities, so that such components become candidates or excluded based on results of the capabilities probe. Alternatively, or in addition, browser capability probe 336 functionality may be incorporated in and/or distributed throughout instrumentation 326 and/or utilities 328 such that pre-assembled executable components 320, 322, 324 dynamically adapt and/or self-configure responsive to browser capability detection. The capabilities database 338 may be encoded in the pre-assembled executable components 320, 322, 324, for example, in the executable instructions of the pre-assembled executable components 320, 322, 324, for example, including nested sequences of try-catch statements.

Figure 4:
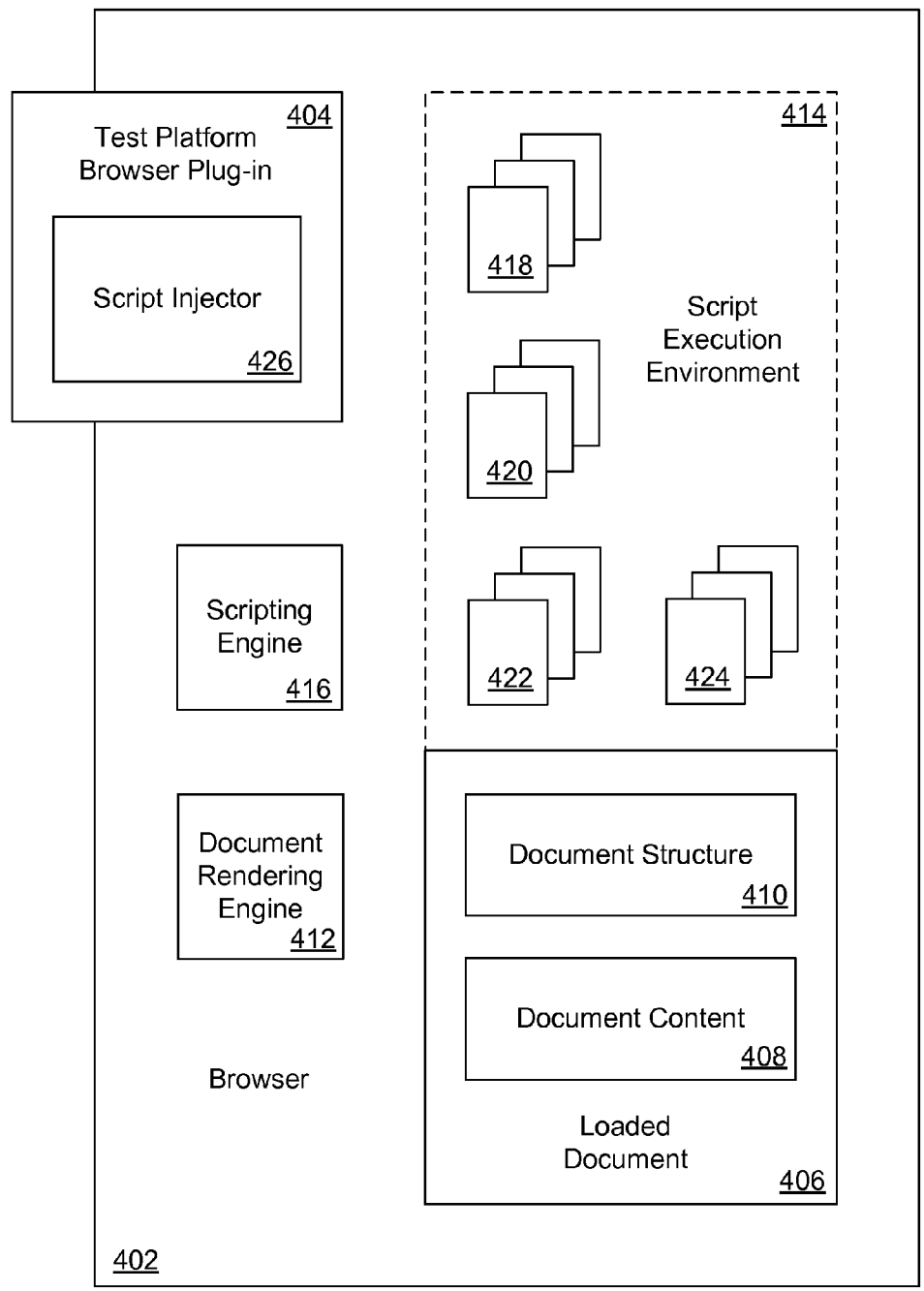
FIG. 4 is a schematic diagram depicting aspects of an example network document browser configured in accordance with at least one embodiment.

FIG. 4 depicts aspects of an example network document browser 400 configured in accordance with at least one embodiment. The example network document browser 400 includes a network document browser 402 with a test platform browser plug-in 404. Network document browsers such as the network document browser 402 are known in the art, so only some salient details are described herein. The browser 402 may load network documents 102 (FIG. 1) into a loaded document data store 406. Such documents 102 may include distinct content 408 and structure 410. The browser 402 may include a document rendering engine 412 configured to render network documents 102 for presentation in accordance with the specified content 408 and/or structure 410.

The browser 402 may also maintain and control a sandboxed script execution environment 414 with a scripting engine 416 capable of executing executable components 418, 420, 422, 424 including statements of a compatible scripting language. The test platform browser plug-in 404 may include a script injector module 426 configured to inject selected pre-assembled executable components 320, 322, 324 (FIG. 3), for example, as instructed by the browser driver 304 through the browser interface 330. Alternatively, or in addition, the selected pre-assembled executable components may be injected into the sandboxed script execution environment 414 with any suitable script injection mechanism including with one or more proxy servers and/or with one or more programmatic objects under the control of the transition-based test platform 120 (FIG. 1) and acting as a programmatic container of the browser 402 and/or the script execution environment 414. The selected pre-assembled executable components may be injected continuously and/or at times throughout a test.

Figure 5:
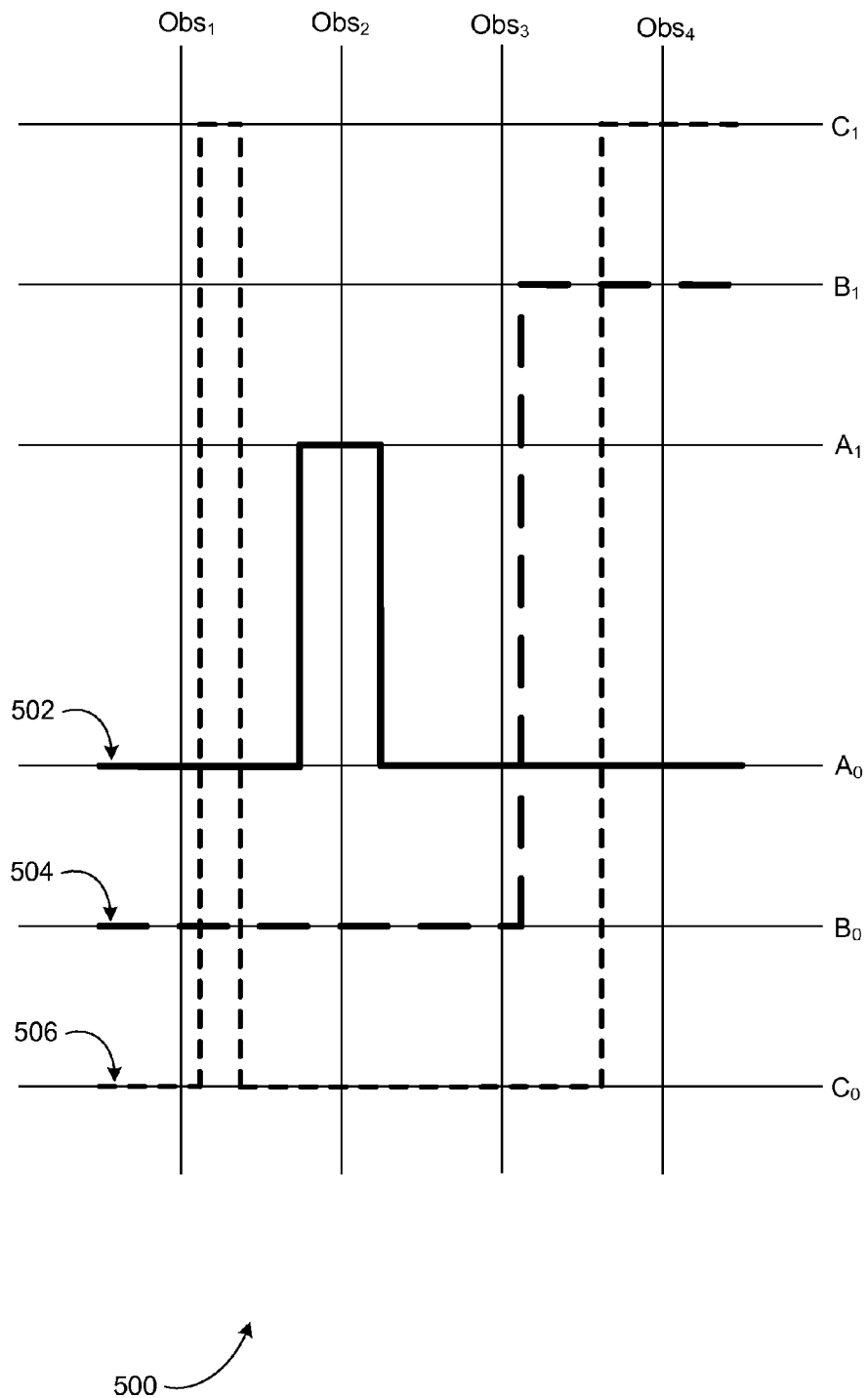
FIG. 5 is an event timing diagram depicting aspects of an example set of events in accordance with at least one embodiment.

FIG. 5 depicts aspects of an example set of events 500 in accordance with at least one embodiment. Event 502 has states $A_0$ and $A_1$. Event 504 has states $B_0$ and $B_1$. Event 506 has states $C_0$ and $C_1$. In this example 500, the browser driver 304 (FIG. 3) is provided access to condition evaluation executable components 424 (FIG. 4) during brief time periods following the indicated "observation times" $Obs_1$, $Obs_2$, $Obs_3$ and $Obs_4$, and not otherwise. The observed states at these times are, respectively, $(A_0, B_0, C_0)$, $(A_1, B_0, C_0)$, $(A_0, B_0, C_0)$ and $(A_0, B_1, C_1)$. An observer restricted to condition evaluation only at these observation times would miss the transition of event 506 from state $C_0$ to $C_1$ between observations $Obs_1$ and $Obs_2$, and would have to wait until observation $Obs_4$, to detect the transition of events 504 and 506 to states $B_1$ and $C_1$. Having access to asynchronous event history that occurs between the observation times $Obs_1$, $Obs_2$, $Obs_3$ and $Obs_4$ can resolve these issues.

FIGS. 6-9 illustrate example flow diagrams showing respective processes 600, 700, 800, and 900 in accordance with at least one embodiment. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 6:
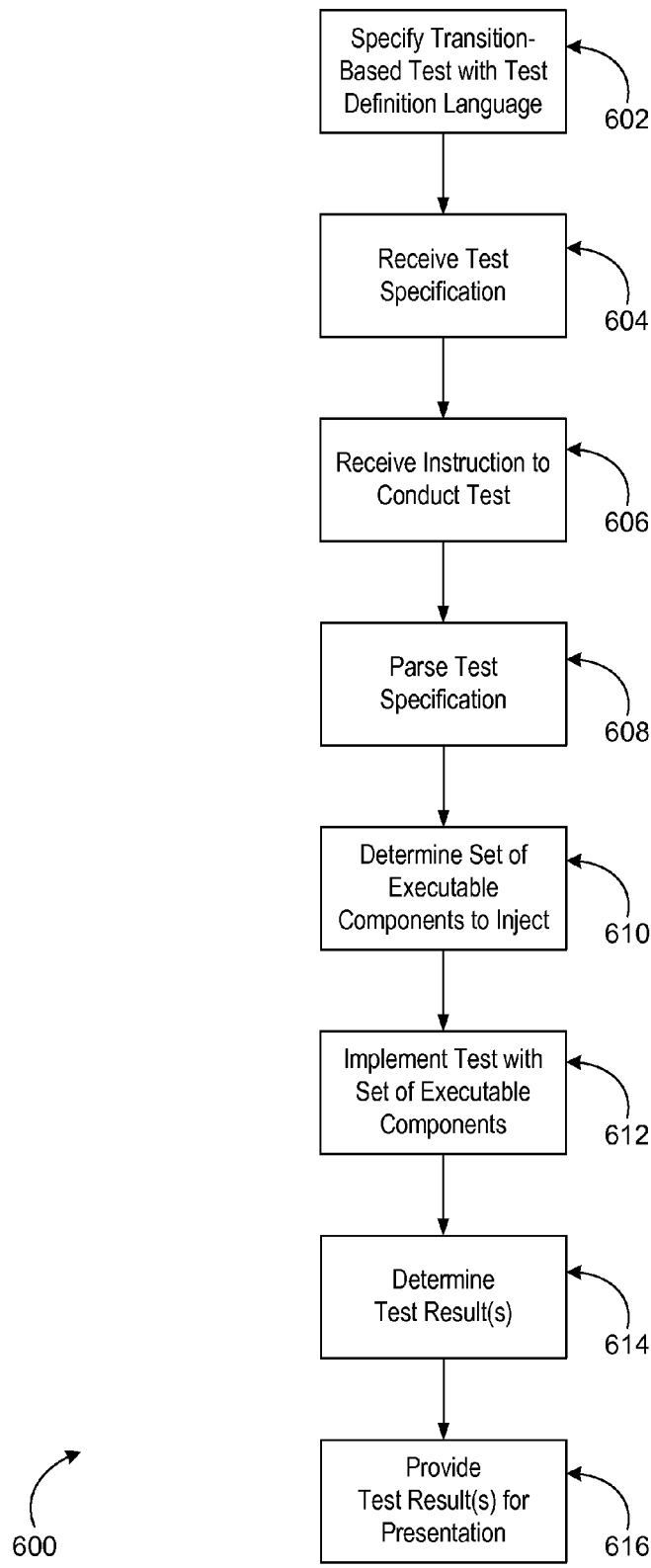
FIG. 6 is a flowchart depicting aspects of an example process for transition-based testing in accordance with at least one embodiment.

FIG. 6 depicts aspects of an example process 600 for transition-based testing in accordance with at least one embodiment. At 602 a transition-based test may be specified with a test definition language. For example, a test developer may specify the test in the test development environment 116 (FIG. 1). At 604, the test specification may be received. For example, the test set specification 200 (FIG. 2) may be received by the test manager 302 (FIG. 3). At 606, an instruction to conduct the specified test may be received. For example, the test manager 302 may receive the instruction from the test development environment 116. At 608, the test specification may be parsed, for example, by the test description parser 306.

At 610, a set of executable components to inject may be determined, for example, by the browser driver 304 (FIG. 3) responsive to instructions received from the test manager 302. At 612, the test may be implemented with the determined set of executable components, for example, by the browser driver 304. At 614, one or more test results may be determined. For example, the test result(s) may be determined by injected condition evaluation executable components 422 (FIG. 4) and/or by the test engine 316. At 616, the test result(s) may be provided for presentation. For example, the test manager 302 may provide the test result(s) to the test development environment 116 (FIG. 1) for presentation to a test developer.

Figure 7:
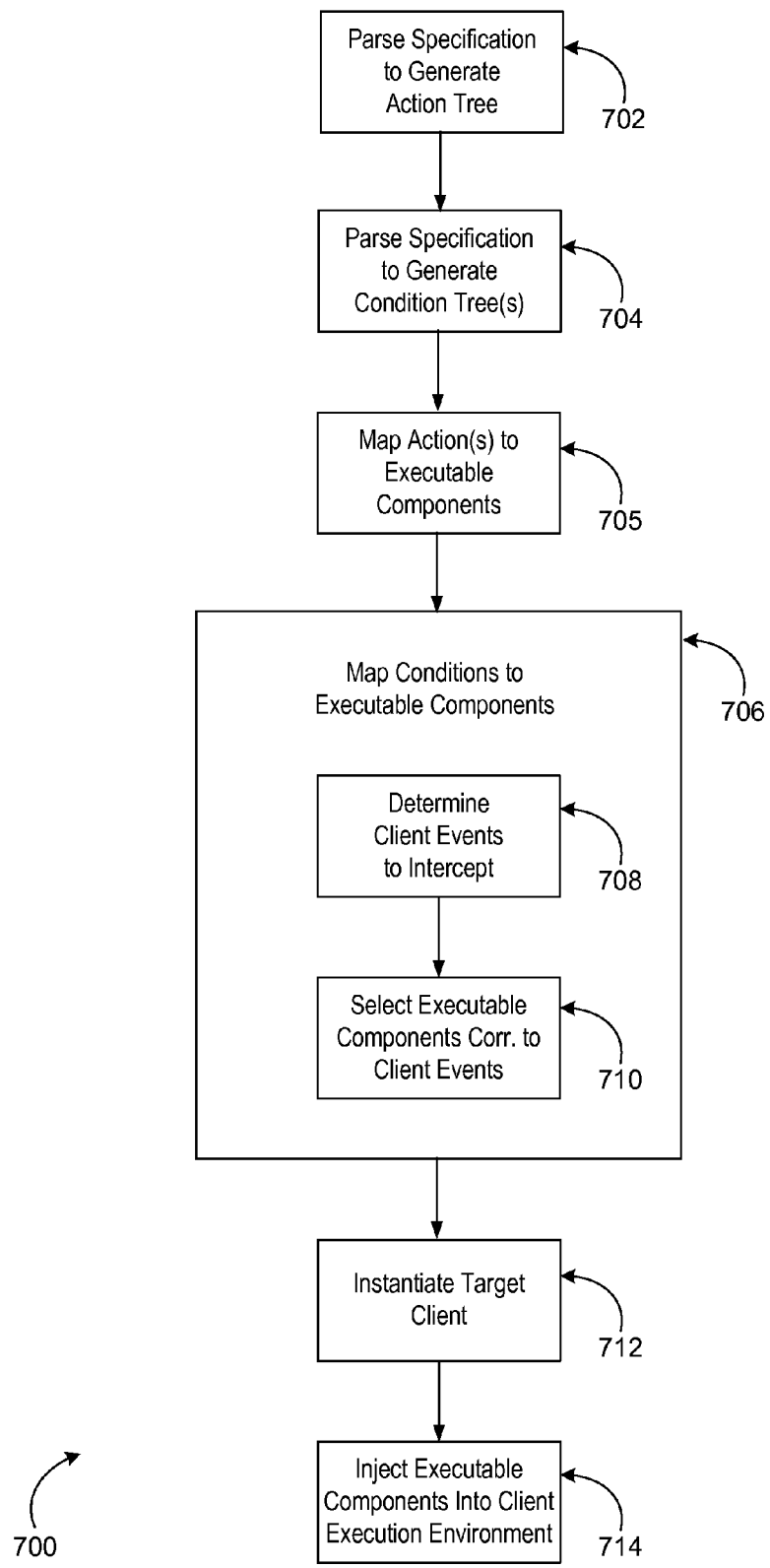
FIG. 7 is a flowchart depicting aspects of an example process for configuring a client under test in accordance with at least one embodiment.

FIG. 7 depicts aspects of an example process 700 for configuring a client under test in accordance with at least one embodiment. At 702, a test specification may be parsed to generate one or more action trees. For example, the test description parser 306 (FIG. 3) may generate the action tree(s) 308. At 704, the test specification may be parsed to generate one or more condition trees. For example, the test description parser 306 may generate the condition tree(s) 312.

At 706, conditions may be mapped to executable components. For example, the browser driver 304 (FIG. 3) may map conditions in the condition tree(s) 312 to a subset of the executable components 302, 322, 324. As part of 706, one or more client events to intercept may be determined at 708 and one or more executable components corresponding to the client events may be selected at 710. Similarly, actions may be mapped to executable components at 705. At 712, a target client may be instantiated. For example, the browser driver 304 (FIG. 3) may instantiated one of the target browser set 106 (FIG. 1). At 714, executable components may be injected into an execution environment of the client, for example, by the browser driver 304. Alternatively, or in addition, the executable components may include multiple portions and/or sub-components which are dynamically selected and/or mapped (collectively, "dynamically mapped") by the executable components during execution. For example, the dynamic mapping may be based at least in part on the condition tree(s) 310, 312, the action tree(s) 308, the client events of 708 and/or dynamic probing of browser capabilities.

Figure 8:
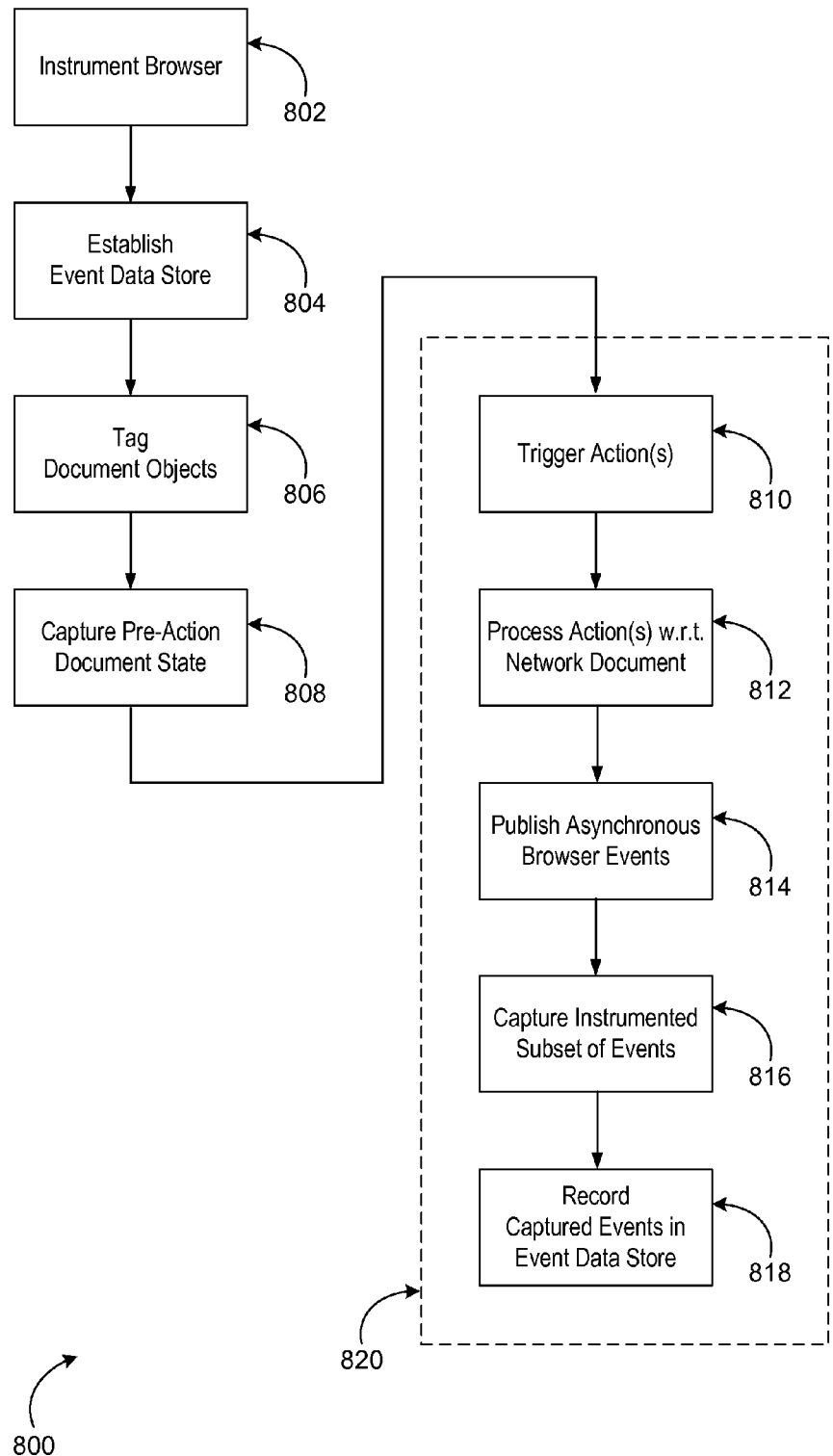
FIG. 8 is a flowchart depicting aspects of an example process for implementing a transition-based test in accordance with at least one embodiment.

FIG. 8 depicts aspects of an example process 800 for implementing a transition-based test in accordance with at least one embodiment. At 802, a selected browser may be instrumented. For example, the browser driver 304 (FIG. 3) may inject event capture executable components into an execution environment of a selected browser of the target browser set 106 (FIG. 1). At 804, an event data store may be established. For example, the injected event capture executable components may established a client-side event data store. At 806, one or more document objects may be tagged. For example, injected utility executable components may traverse a document object model (DOM) tree and generate unique object identifiers corresponding to each document object in the DOM tree. At 808, pre-action document state may be captured. For example, injected utility executable components may query identified document objects for parameter values corresponding to their state. Document state may correspond to the collective states of its component objects.

At 810, one or more test actions may be triggered. For example, injected utility executable components may interact with a programmatic interface of the client to trigger the test actions. At 812, one or more actions with respect to a network document may be processed. For example, the action(s) of 810 may be directed to the network document and, having triggered the action(s), the network document browser may process the network document to cause and/or perform the actions. At 814, one or more asynchronous browser events may be published, for example, by the network document browser as it is processing the network document responsive to the triggered actions. At 816, an instrumented subset of network document browser events may be captured. For example, events associated with the event capture executable components injected at 802 may be captured by the injected event capture executable components. Additional events may occur, but may not be captured. However, if the injected executable component set is optimal with respect to the set of conditions to be evaluated, this may enhance efficiency. At 818, the captured events may be recorded in the established data store, for example, by the injected event capture executable components. Dashed line 820 indicates that these blocks may occur during a time period when condition evaluation executable components are inaccessible (e.g., between the observation times $Obs_1$, $Obs_2$, $Obs_3$ and $Obs_4$ of FIG. 5) without loss of relevant event data.

Figure 9:
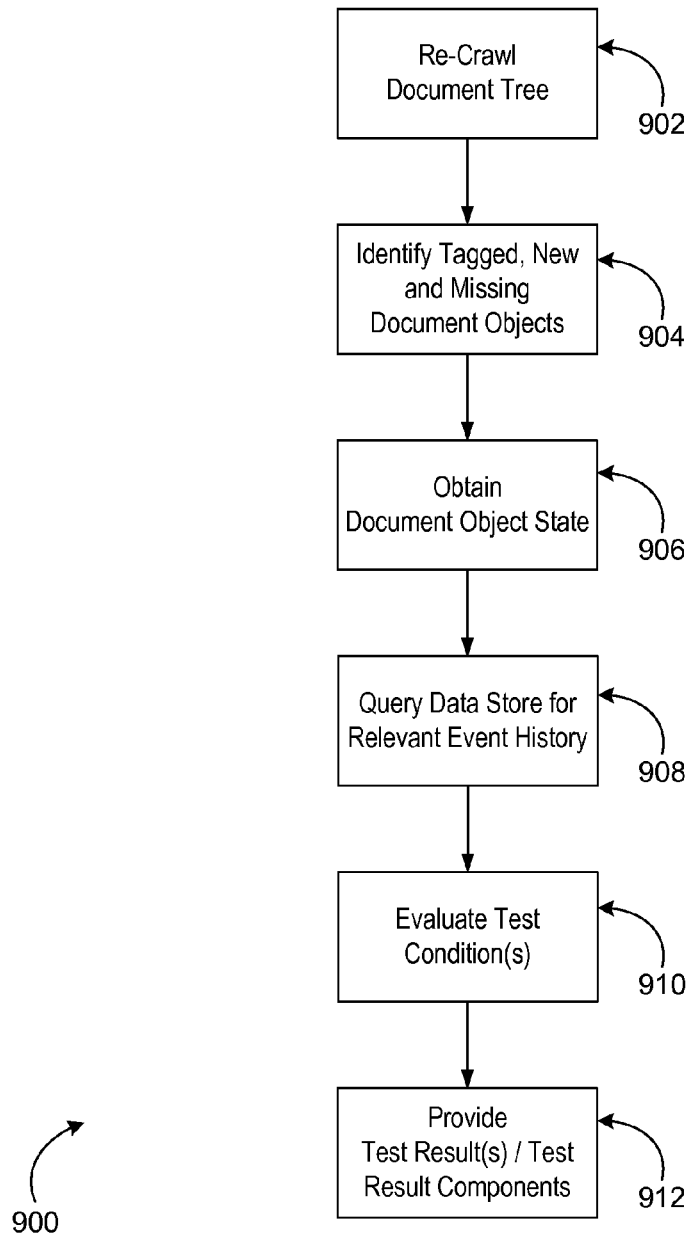
FIG. 9 is a flowchart depicting aspects of an example process for implementing a transition-based test in accordance with at least one embodiment.

FIG. 9 depicts aspects of an example process 900 for implementing a transition-based test in accordance with at least one embodiment. For example, process 900 may occur following process 800 and/or during a time period when condition evaluation executable components are accessible. At 902, a document tree may be re-crawled. For example, injected utility executable components may traverse the document object model (DOM) tree. At 904, tagged, new and missing document objects may be identified, for example, by comparing found document objects and their associated unique object identifiers with the set discovered at 806 (FIG. 8). At 906, states of found document objects may be obtained, for example, by injected utility executable components. At 908, an event data store may be queried for relevant event history, for example, the data store established and updated by process 800 may be queried. At 910, one or more test conditions may be evaluated, for example, by injected test condition evaluation executable components. At 912, one or more test results and/or test result components may be provided. For example, the browser driver 304 (FIG. 3) may receive the test results and/or test result components from the injected test condition evaluation executable components via the test platform browser plug-in 404 (FIG. 4) and provide them to the test manager 302 for further evaluation and/or presentation to a user. In accordance with at least one embodiment, executable components may be injected continuously and/or multiple times throughout a test. Unique object identifiers may be unique with respect to a particular injection and not necessarily between injections.

Figure 10:
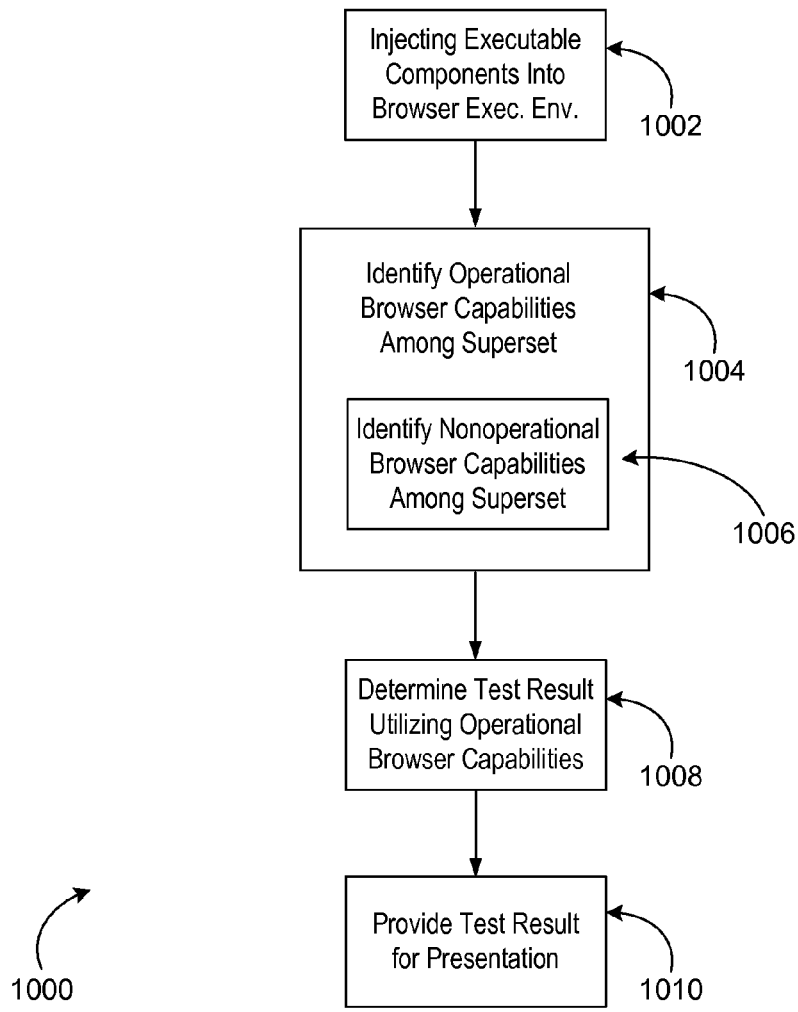
FIG. 10 is a flowchart depicting aspects of an example process for testing with a vendor and version independent browser driver in accordance with at least one embodiment.

FIG. 10 depicts aspects of an example process 1000 for testing with a vendor and version independent browser driver in accordance with at least one embodiment. At 1002, a set of pre-assembled executable components may be injected into an execution environment of a network document browser such as browser 402 (FIG. 4). The network document browser may be associated with a browser vendor and a browser version. At 1004, an operational set of browser capabilities of the network document browser may be identified without utilizing the browser vendor and the browser version. For example, executable components 418 may identify the operational set of browser capabilities among a superset of browser capabilities associated with a plurality of network document browsers such as the target browser set 106 (FIG. 1). Identifying the operational set of browser capabilities at 1004 may include identifying one or more nonoperational interface elements at 1006. At 1008, a test result utilizing the operational set of browser capabilities may be determined. At 1010, the test result may be provided for presentation to a user such as a user of the transition-based test platform 102 (FIG. 1).

Figure 11:
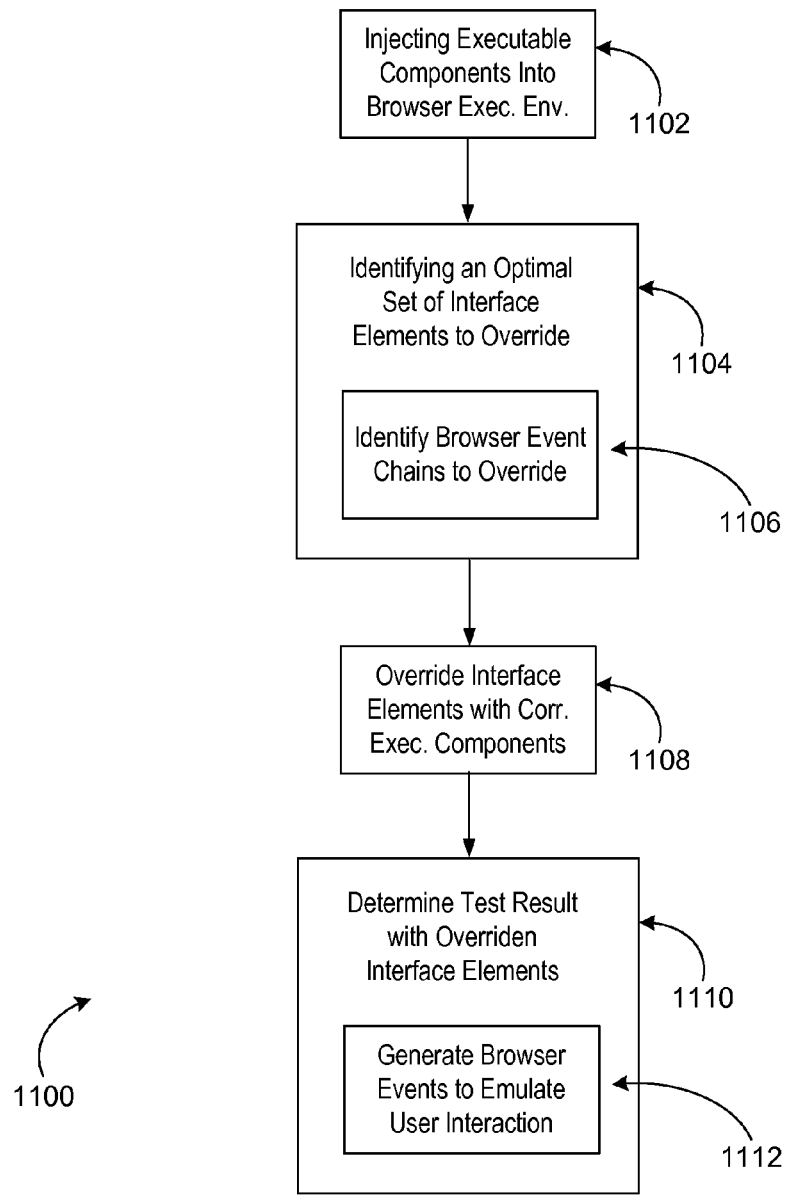
FIG. 11 is a flowchart depicting aspects of an example process for testing with a vendor and version independent browser driver in accordance with at least one embodiment.

FIG. 11 depicts aspects of an example process 1100 for testing with a vendor and version independent browser driver in accordance with at least one embodiment. At 1102, a set of pre-assembled executable components such as executable components 320, 322, 324 (FIG. 3) may be injected into an execution environment of a network document such as the script execution environment 414 (FIG. 4). At 1104, an optimal (e.g., minimized and/or non-maximal) set of programmatic interface elements to override as part of implementing a test may be identified with the set of pre-assembled executable components executing in the execution environment of the network document browser. Determining a result of a test may include triggering a browser event chain associated with a user interface hierarchy maintained by the network document browser (e.g., a browser event that propagates through one or more levels of the user interface hierarchy thereby creating a chain of events). Identification of the optimal set may include identifying one or more such browser event chains at 1106, for example, by traversing the user interface hierarchy and determining the browser event propagation path.

At 1108, the optimal set of programmatic interface elements may be overridden with corresponding programmatic interface elements of the set of pre-assembled executable components. At 1110, a result of the test may be determined with at least one overridden programmatic interface element. In accordance with at least one embodiment, determining the result of the test may include generating browser events to emulate user interaction at 1112, for example, in a case where user interaction with a graphical user interface maintained by the network document browser would trigger a browser event chain but artificial triggering of a browser event (e.g., by the set of pre-assembled executable components) does not trigger each of the browser events in the browser event chain, resulting in broken browser event chains without intervention. In accordance with at least one embodiment, the set of pre-assembled executable components executing in the execution environment of the network document browser may emulate a user input device, for example, at least in part by maintaining a corresponding virtual user input device and generating one or more browser events of browser event chains based at least in part on a state of the virtual user input device. For example, the virtual user input device may be a virtual mouse and emulating the virtual mouse may include determining movement paths of the virtual mouse corresponding to test actions and generating browser events corresponding to the determined movement paths.

Figure 12:
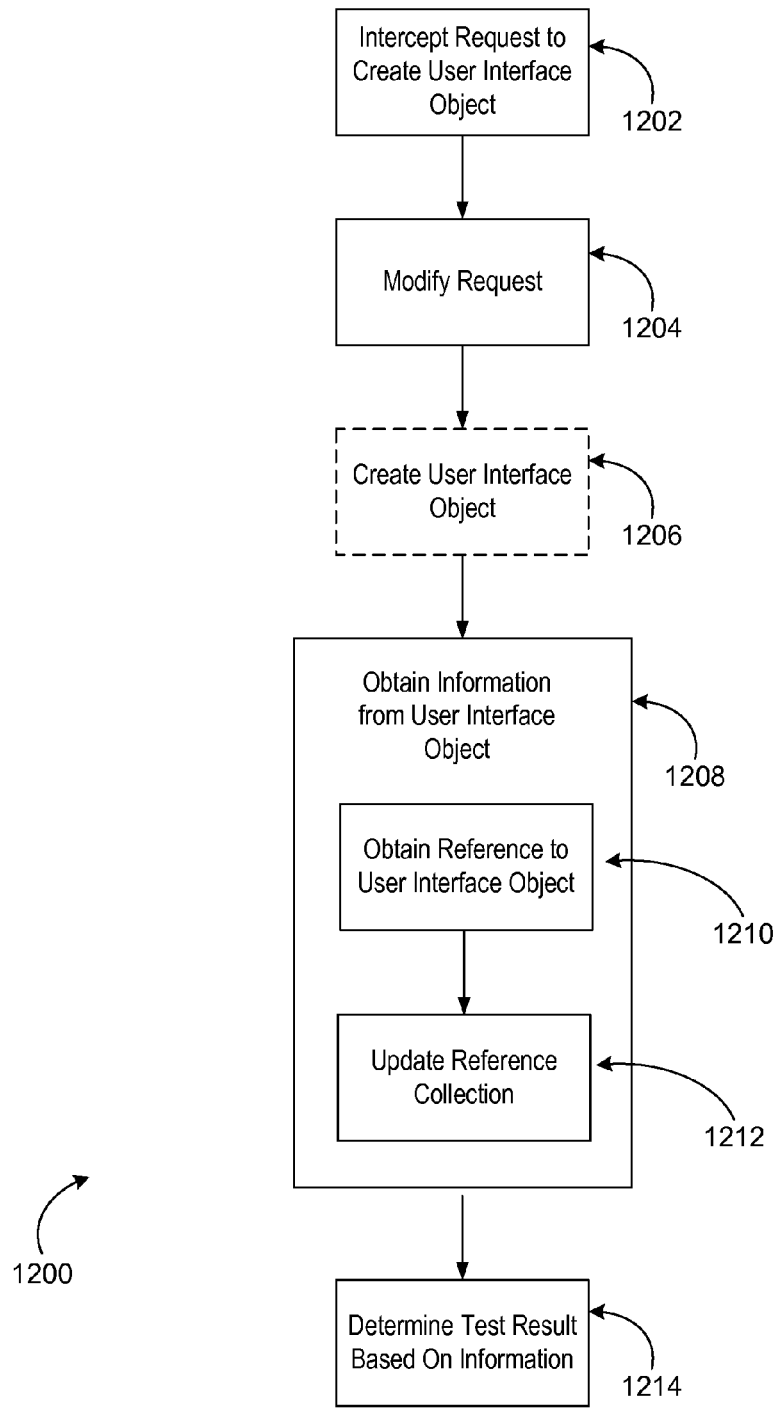
FIG. 12 is a flowchart depicting aspects of an example process for testing with a vendor and version independent browser driver in accordance with at least one embodiment.

FIG. 12 depicts aspects of an example process 1200 for testing with a vendor and version independent browser driver in accordance with at least one embodiment. At 1202, a request to create a user interface object may be intercepted, for example, with a set of pre-assembled executable components executing in an execution environment of a network document browser such as executable components 320, 322, 324 (FIG. 3). At 1204, the request to create the user interface object may be modified to associate the user interface object with a unique identifier. For example, the user interface object may be a graphical user interface window and modifying the request to create the user interface object may include setting a name of the window to correspond to the unique identifier.

Control of a thread of execution in the execution environment of the network document browser may be surrendered at least in part to enable the network document browser to create the user interface object at 1206. For example, the execution environment may be single threaded. Upon regaining control of the thread of execution, for example, at 1208, information may be obtained from the user interface object. For example, at 1210 a programmatic reference to the user interface object may be obtained based at least in part on the unique identifier. Such programmatic references to user interface objects may be maintained in a collection, for example, by the browser state tracking module 332 (FIG. 3) of the browser driver 304. At 1212, such a collection may be updated. At 1214, a result of the test may be determined based at least in part on information obtained from the user interface object utilizing the unique identifier.

Figure 13:
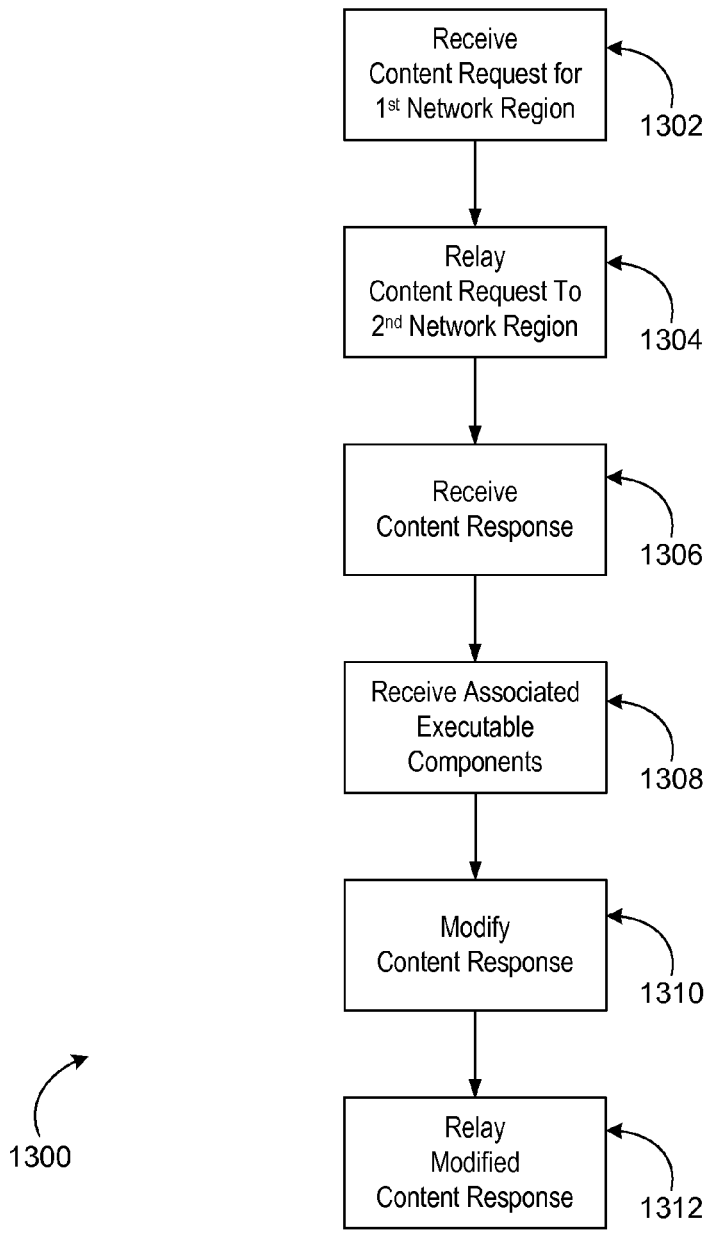
FIG. 13 is a flowchart depicting aspects of an example process for managing network document browser security in a testing context in accordance with at least one embodiment.

FIG. 13 depicts aspects of an example process 1300 for managing network document browser security in a testing context in accordance with at least one embodiment. Example process 1300 may occur as part of a test of a network document browser configured at least to associate different network regions with different security contexts maintained by the network document browser. At 1302, a first content request may be received from the network document browser for network content associated with a first network region. At

1304, the content request may be relayed to a second network region. At 1306, a corresponding content response may be received. At 1308, associated executable components may be received such as a set of pre-assembled executable components configured to at least partially implement the test when executed in an execution environment of the network document browser. At 1310, the content response may be modified to include the network content and the associated executable components, and to appear to originate from the first network region thereby causing the network document browser to associate the network content and the set of pre-assembled executable components with a particular security context. At 1312, the modified content response may be relayed to the network document browser.

Figure 14:
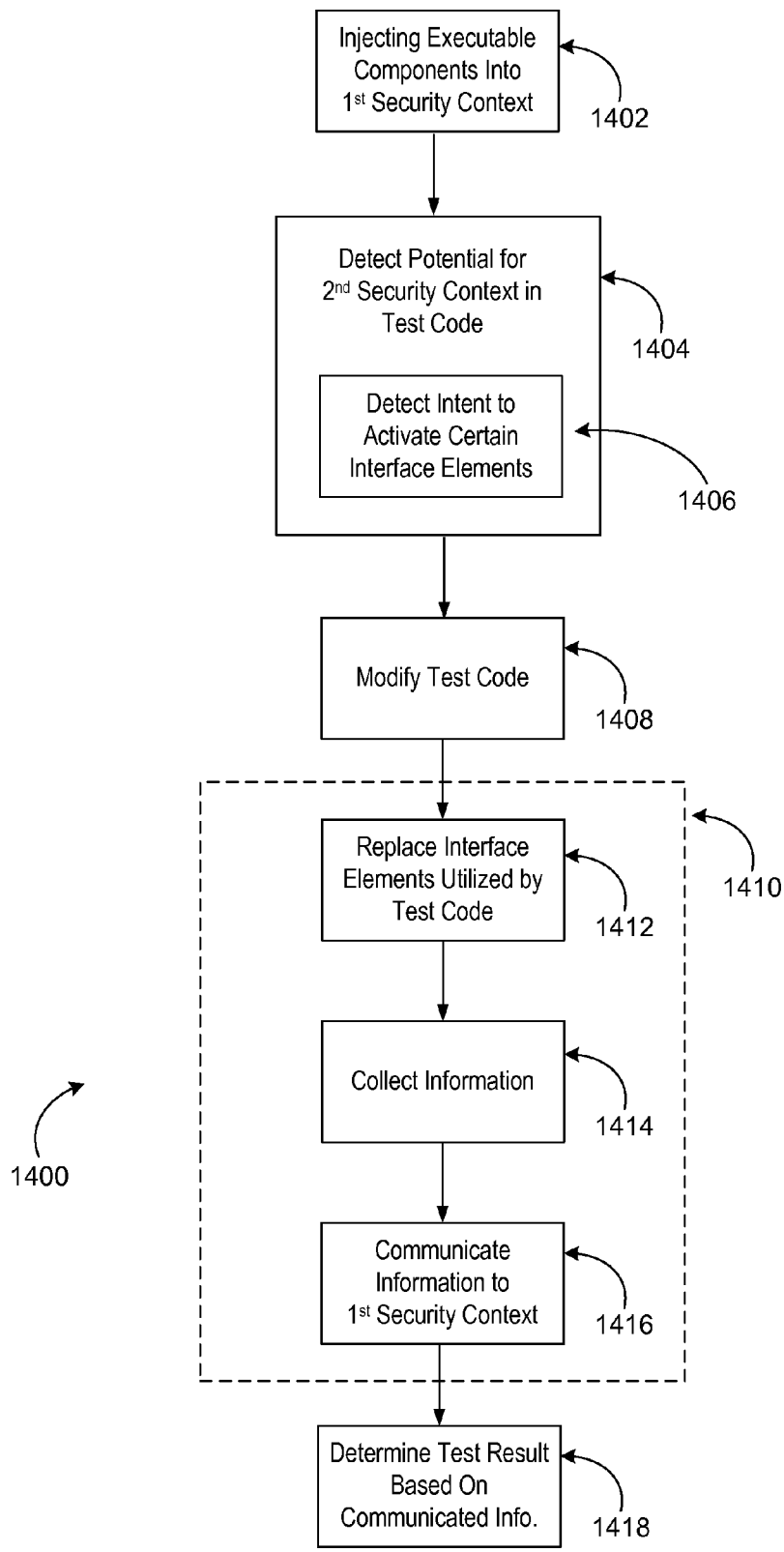
FIG. 14 is a flowchart depicting aspects of an example process for managing network document browser security in a testing context in accordance with at least one embodiment.

FIG. 14 depicts aspects of an example process 1400 for managing network document browser security in a testing context in accordance with at least one embodiment. At 1402, a set of pre-assembled executable components may be injected into an execution environment of a network document browser. The execution environment may have multiple security contexts (e.g., execution sandboxes such that executable components executing in a first security context are inhibited from interacting with executable components executing in a second security context), and the set of pre-assembled executable components may be executed in the first security context of the execution environment. At 1404, it may be detected, with the set of pre-assembled executable components executing in the first security context of the execution environment, that test code, when executed in the first security context of the execution environment, will cause creation of a second security context for at least a portion of the test code. For example, the test code may interact with the network document browser utilizing interface elements of one or more programmatic interfaces of the network document browser and detecting that test code will cause creation of the second security context may include detecting, in the test code, an intent to activate one or more of a predefined set of the interface elements at 1406.

At 1408, the portion of the test code may be modified to include one or more of the set of pre-assembled executable components configured at least to communicate information from the second security context to the first security context when the one or more of the set of pre-assembled executable components are executed in the second security context along with the at least a portion of the test code. For example, at 1412 the set of pre-assembled executable components may replace interface elements utilized by the test code. At 1414, information may be collected with the replaced interface elements as they are activated by the test code. At 1416, the collected information may be communicated to the first security context. As indicated by dashed line 1410, 1412, 1414 and 1416 may execute in the second security context. At 1418, a test result may be determined based at least in part on the information communicated from the second security context.

Figure 15:
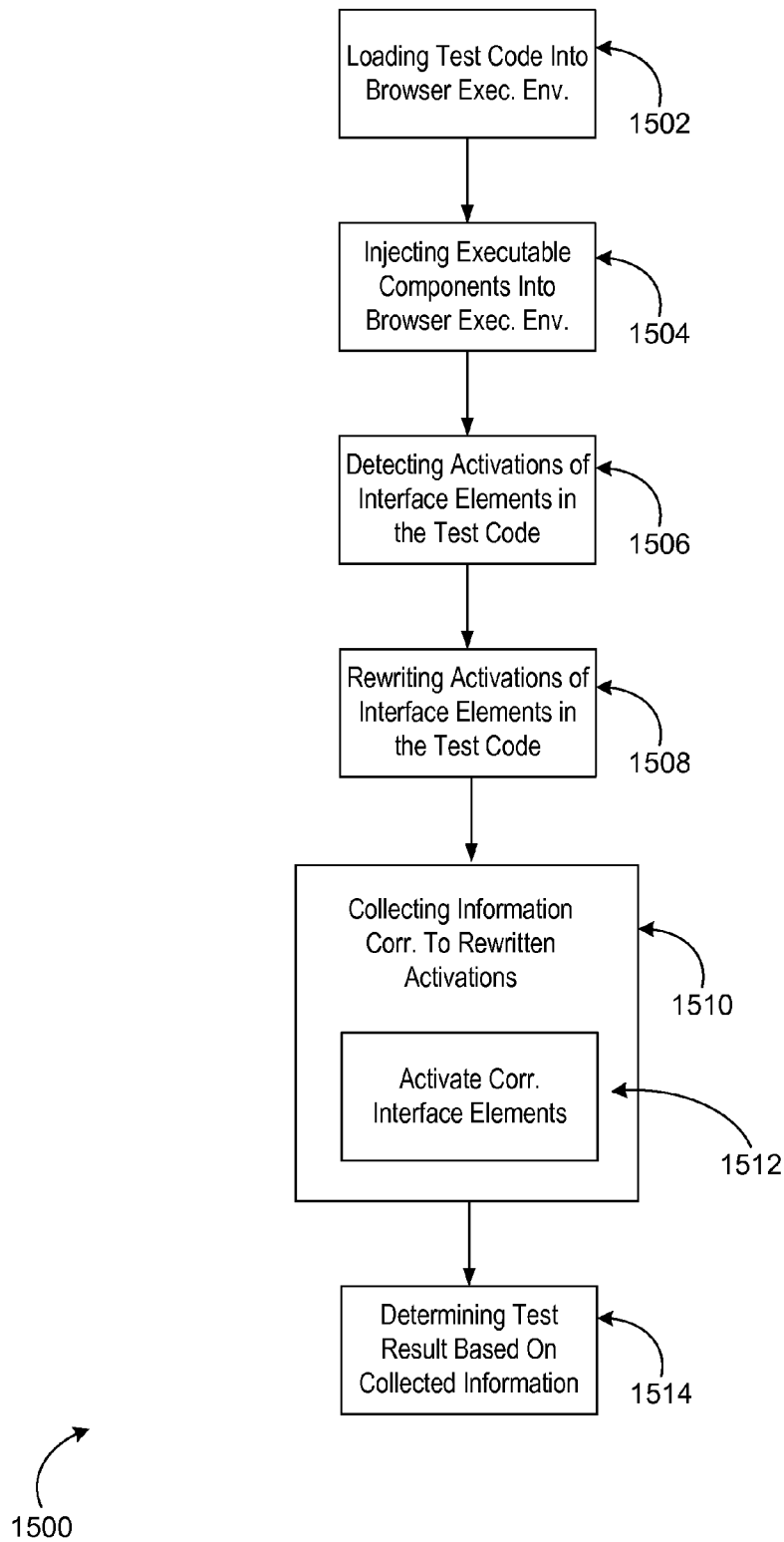
FIG. 15 is a flowchart depicting aspects of an example process for managing network document browser security in a testing context in accordance with at least one embodiment.

FIG. 15 depicts aspects of an example process 1500 for managing network document browser security in a testing context in accordance with at least one embodiment. At 1502, test code may be loaded into an execution environment of a network document browser. For example, the test code may be part of loaded document 406 (FIG. 4) and may be loaded into the script execution environment 414. The test code may interact with the network document browser utilizing interface elements of one or more programmatic interfaces of the network document browser. At 1504, a set of pre-assembled executable components may be injected into the execution environment of the network document browser. In accordance with at least one embodiment, the execution environment may execute the set of pre-assembled executable components in a security context that inhibits replacement of the interface elements by the set of pre-assembled executable components.

At 1506, activations of the interface elements in the test code may be detected with the set of pre-assembled executable components executing in the security context of the execution environment. At 1508, the activations of the interface elements in the test code may be rewritten with activations of corresponding executable components of the set of pre-assembled executable components. At 1510, information corresponding to rewritten activations may be collected when the test code is executed in the security context of the execution environment. At 1512, corresponding interface elements may be activated by the set of pre-assembled executable components. At 1514, a test result may be determined based at least in part on the collected information.

Figure 16:
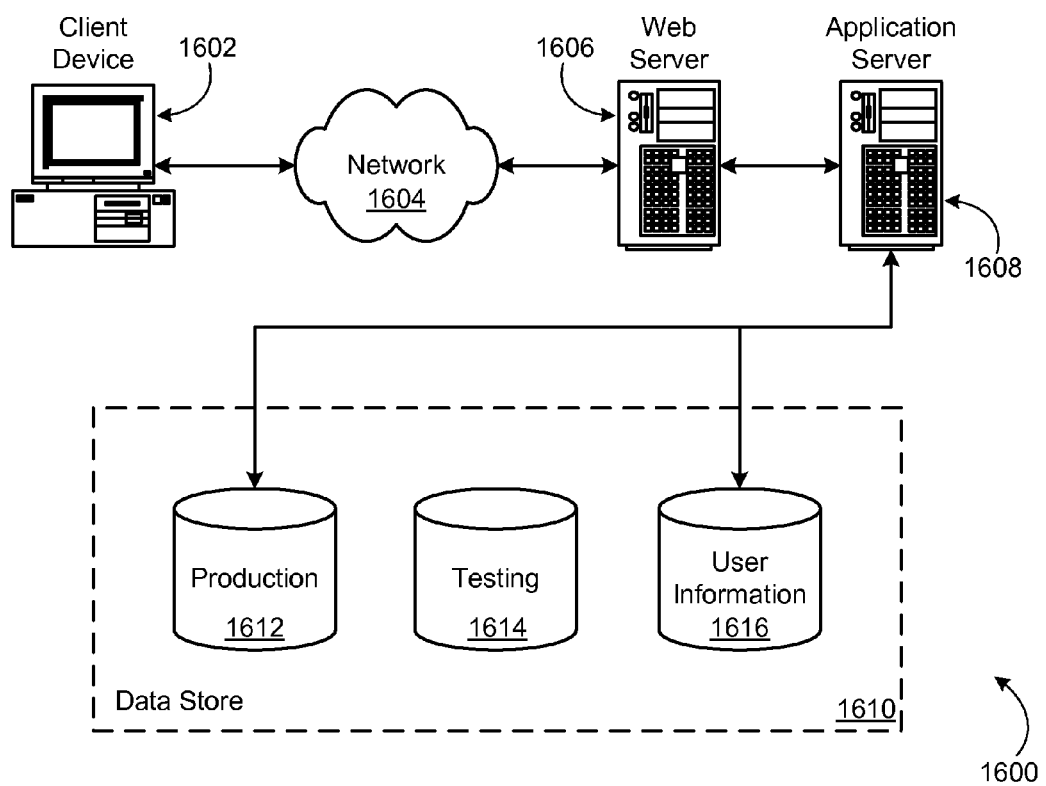
FIG. 16 illustrates an environment in which various embodiments can be implemented.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for client-side event logging, comprising:
    receiving, by a computer system, a set of executable components selected from a predefined collection of executable components to implement at least a test of a computer system state transition, the set of executable components including a set of test condition evaluation components and a set of network document browser event capture components optimized to obtain information to facilitate evaluation of a set of test conditions with the set of test condition evaluation components;
    injecting the set of executable components into an execution environment of a network document browser, the execution environment providing discontinuous access to the set of test condition evaluation components;
    during a first period of time when access to the set of test condition evaluation components is not available in the execution environment of the network document browser, recording, by the computer system, events relevant to the test with the injected set of network document browser event capture components;
    during a second period of time when access to the set of test condition evaluation components is available in the execution environment of the network document browser, evaluating, by the computer system, the set of test conditions based at least in part on information obtained by the injected set of test condition evaluation components and the events recorded by the injected set of network document browser event capture components; and
    providing one or more results of the evaluating for presentation to a user.

2. A computer-implemented method in accordance with claim 1, wherein the network document browser comprises a hypertext document browser, the execution environment comprises a sandboxed script execution environment maintained by the hypertext document browser and individual executable components comprise statements of a scripting language suited to execution in the sandboxed script execution environment.

3. A computer-implemented method in accordance with claim 1, wherein the execution environment provides the discontinuous access at least in part by maintaining control of a thread of execution of the execution environment and executing individual test condition evaluation components during the second period of time.

4. A computer-implemented method in accordance with claim 1, wherein the execution environment executes individual network document browser event capture components during the first period of time responsive to corresponding asynchronous network document browser events.

5. A computer-implemented method in accordance with claim 1, wherein recording individual events relevant to the test comprises recording associated event information in a data store that is accessible in the execution environment during the first period of time and the second period of time.

6. A computer-implemented method in accordance with claim 5, wherein the recorded event information comprises a timestamp corresponding to the event and an event type corresponding to the event.

7. A computer-implemented method for client-side event logging, comprising:
receiving, by a computer system, a set of executable components configured to, at least in part, implement a test of a computer system state transition, the set of executable components including a first subset of executable components associated with a set of test conditions to be evaluated as part of the test and a second subset of executable components selected to record an optimal set of events with respect to evaluation of the set of test conditions;
during a first period of time when access to the first subset of executable components is not available in an execution environment, recording, by the computer system, one or more events relevant to the test with the second subset of executable components;
during a second period of time when access to the first subset of executable components is available in the execution environment, evaluating, by the computer system, the set of test conditions based at least in part on information obtained by the first subset of executable components and the one or more events recorded by the second subset of executable components, evaluating a test condition comprises, during the second period of time, obtaining one or more event parameter values recorded during the first period of time and evaluating the test condition as a function of the one or more event parameter values; and
providing one or more results of the evaluating for presentation.

8. A computer-implemented method in accordance with claim 7, wherein the one or more events that are relevant to the test correspond to one or more event parameter values utilized to evaluate the set of test conditions during the second period of time.

9. A computer-implemented method in accordance with claim 7, wherein evaluating the set of test conditions comprises detecting an addition of a network document object to a network document based at least in part on the one or more events recorded during the first period of time.

10. A computer-implemented method in accordance with claim 7, wherein evaluating the set of test conditions comprises detecting a deletion of a network document object from a network document based at least in part on the one or more events recorded during the first period of time.

11. A computer-implemented method in accordance with claim 7, wherein evaluating the set of test conditions comprises detecting a change to a state of a network document object in a network document based at least in part on the one or more events recorded during the first period of time.

12. A computerized system for client-side event logging, comprising:
a client configured to, at least:
maintain an execution environment for user-provided executable components; and
publish a predefined collection of events to the execution environment such that individual events of the predefined collection of events are selectively receivable by the user-provided executable components, the client publishing the predefined collection of events at least in part by maintaining a programmatic interface having interface elements corresponding to the predefined collection of events and the user-provided executable components and the user-provided executable components receiving the published events with the programmatic interface;
a client testing module configured to, at least:
inject, into the execution environment, a set of executable components configured to, at least in part, implement a test of a client state transition, the set of executable components including a first subset of executable components associated with a set of conditions to be evaluated as part of the test and a second subset of executable components selected to record an optimal set of the predefined collection of events with respect to evaluation of the set of conditions; and
provide one or more outputs of the injected set of executable components for presentation; and
one or more computer processors configured to facilitate at least the client and the client testing module.

13. A computerized system in accordance with claim 12, wherein the optimal set of the predefined collection of events is smaller than the published predefined collection of events.

14. A computerized system in accordance with claim 13, wherein the client testing module is further configured to determine the optimal set of the predefined collection of events based at least in part on an identified set of information to be utilized when evaluating the set of conditions and identified items of information provided by individual events of the predefined collection of events.

15. A computerized system in accordance with claim 14, wherein the client testing module is further configured to determine the optimal set of the predefined collection of events at least in part by mapping individual conditions to one or more events in the predefined collection of events.

16. A computerized system in accordance with claim 15, wherein mapping individual conditions to one or more events in the predefined collection of events comprises mapping one or more specified parameters of the condition to one or more events based at least in part on one or more event parameters provided by the one or more events.

17. One or more non-transitory computer-readable data storage devices storing computer-executable instructions that configure one or more computers to, at least:
receive a set of executable components configured to, at least in part, implement a test of a transition of a computer system state, the computer system state including a state of a network document;
generate, at least in part by executing one or more of the set of executable components, a plurality of unique object identifiers corresponding to a plurality of network document objects of the network document;

cause, at least in part by executing one or more of the set of executable components, the transition of the computer system state as part of the test;

detect, at least in part by executing one or more of the set of executable components, a change to the state of the network document based at least in part on the generated plurality of unique object identifiers, wherein detecting the change to the state of the network document comprises detecting a change to the plurality of unique object identifiers corresponding to the plurality of network document objects of the network document; and provide a test result based at least in part on the detected change of the state of the network document.

18. One or more non-transitory computer-readable data storage devices in accordance with claim 17, wherein the state of the network document is based at least in part on individual states of individual network document objects of the network document.

19. One or more non-transitory computer-readable data storage devices in accordance with claim 17, wherein a network document browser maintains a set of references to the plurality of network document objects distinct from the generated plurality of unique object identifiers.

20. One or more non-transitory computer-readable data storage devices in accordance with claim 19, wherein the set of references to the plurality of network document objects are maintained by the network document browser in accordance with a document object model.

21. One or more non-transitory computer-readable data storage devices in accordance with claim 20, wherein a first network document object is associated with a first unique object identifier, a second network document object is associated with a second unique object identifier and the first network document object has a same reference in accordance with the document object model as the second network document object.

* * * * *